Sept. 26, 1933.　　　　J. K. DOUGLAS　　　　1,928,150
HYDRAULIC DRIVE FOR MACHINE TOOLS
Filed Sept. 20, 1930　　　3 Sheets-Sheet 1

Inventor
JAMES K. DOUGLAS.
By Wesley P. Merrill
Attorney

Sept. 26, 1933.  J. K. DOUGLAS  1,928,150
HYDRAULIC DRIVE FOR MACHINE TOOLS
Filed Sept. 20, 1930  3 Sheets-Sheet 2

Inventor
JAMES K. DOUGLAS.
By Wesley P. Merrill
Attorney

Sept. 26, 1933.      J. K. DOUGLAS      1,928,150
HYDRAULIC DRIVE FOR MACHINE TOOLS
Filed Sept. 20, 1930      3 Sheets-Sheet 3

Fig. 3.

Inventor
JAMES K. DOUGLAS.

By Wesley P. Merrill
Attorney

Patented Sept. 26, 1933

1,928,150

UNITED STATES PATENT OFFICE 1,928,150

HYDRAULIC DRIVE FOR MACHINE TOOLS

James K. Douglas, Milwaukee, Wis., assignor to The Oilgear Company, Milwaukee, Wis., a corporation of Wisconsin Application September 20, 1930
Serial No. 483,228

9 Claims. (Cl. 90—34)

This invention relates to hydraulic drives for machine tools of the reciprocating type.

The machine tool to which the invention is particularly adapted has a table for carrying the work to be machined, a tool head for carrying a cutting tool, a drive for reciprocating the work table relatively to the tool head, and a cross-feed for moving the tool head transversely of the work table.

The table is advanced at a predetermined cutting speed to enable the tool to take a cut from the work and then the table is retracted at high speed, the tool either riding over the surface of the work or being out of engagement therewith while the table is being retracted.

The speed of the machine may be varied in accordance with the requirements of the work being performed but the ratio between the forward and the return speeds always remains the same. Consequently, it is not practical to use the machine for grinding operations as the variation between the two speeds is too great.

An object of the invention is to provide a hydraulic drive which will operate a machine tool of the reciprocating type at the correct speeds for either cutting or grinding operations.

Another object is to provide a hydraulically operated cross-feed which is independent of the main hydraulic circuit.

Another object is to provide a hydraulic drive of this character which is positive and precise in operation.

According to the invention as it is ordinarily embodied, the machine is operated by a piston and a cylinder, the piston is moved in one direction at cutting or grinding speeds by hydraulic pressure acting upon its rod end and is moved in the opposite direction either at grinding speed by hydraulic pressure acting upon the entire area of its other end or at rapid traverse speed for idle return of the cutting tool by hydraulic pressure acting upon the difference between the areas of its two ends.

The invention further provides a cross-feed motor, a separate pump for operating the same and means for bypassing freely the output of this pump when the same is not being employed for operating the cross-feed motor.

The invention is illustrated in the accompanying drawings in which the views are as follows:—

Fig. 3 is a schematic drawing showing the valve plungers and motor pistons in characteristic positions other than those shown in Fig. 2.

Figure 1:
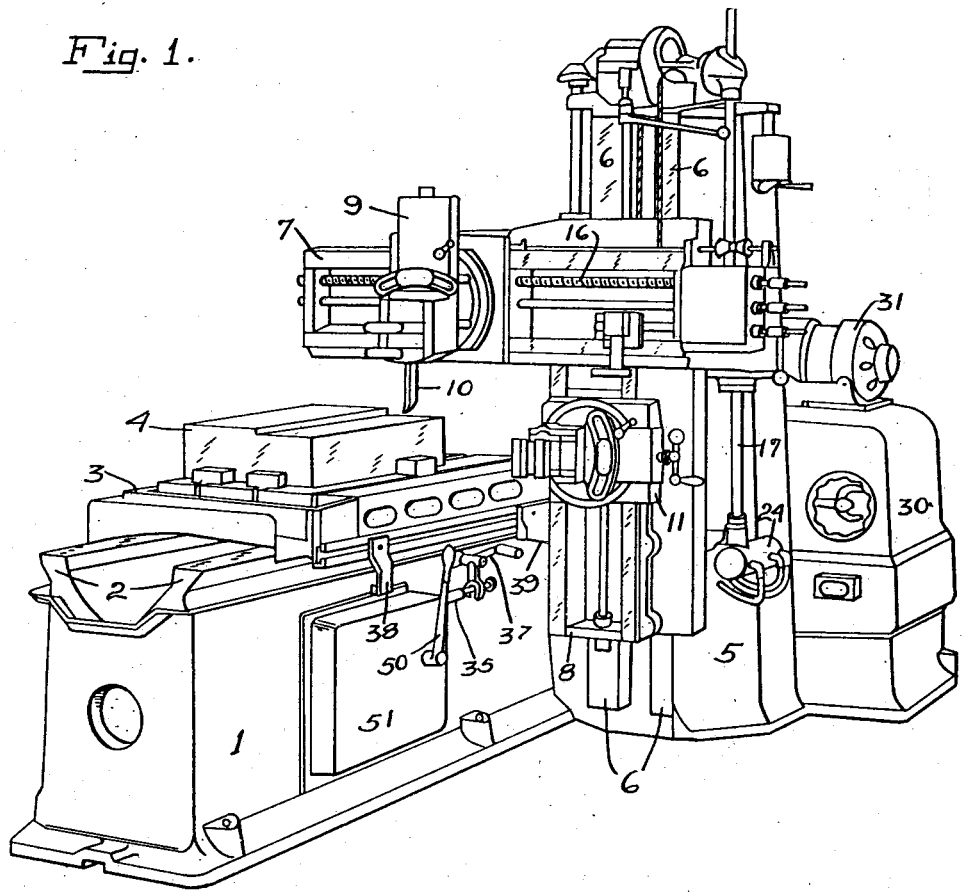
Fig. 1 is a perspective view of a planer in which the invention is embodied.

The invention is shown embodied in a well known planer which is illustrated and described in the catalogs of the Rockford Machine Tool Company of Rockford, Illinois and, as the machine per se forms no part of the present invention, only a brief description thereof will be given therein.

The machine has a bed or frame 1 provided with horizontal ways 2, a work table or carriage 3 arranged upon the ways 2 to reciprocate horizontally thereon and to carry a piece of work 4, a column 5 carried by the bed 1 and provided with vertical guides 6, a cross rail 7 and a side head rail 8 arranged upon the guides 6 and movable vertically thereon, a tool head or carriage 9 arranged upon the cross rail 7 and movable horizontally thereon to carry a cutting tool 10 transversely of the table 3, and a side head 11 carried by the side head rail 8 to carry a cutting tool not shown.

The table 3 is advanced along the ways 2 to enable the tool 10 to take a cut from the work 4 and is then retracted to its initial position. The tool head 9 is then advanced along the cross rail 7 to bring the tool 10 into position to take another cut from the work 4 when the table 3 is advanced again.

While the invention has been shown embodied in a machine in which the work is advanced and retracted, it may be readily embodied in a machine in which the tool head is advanced and retracted.

Figure 2:
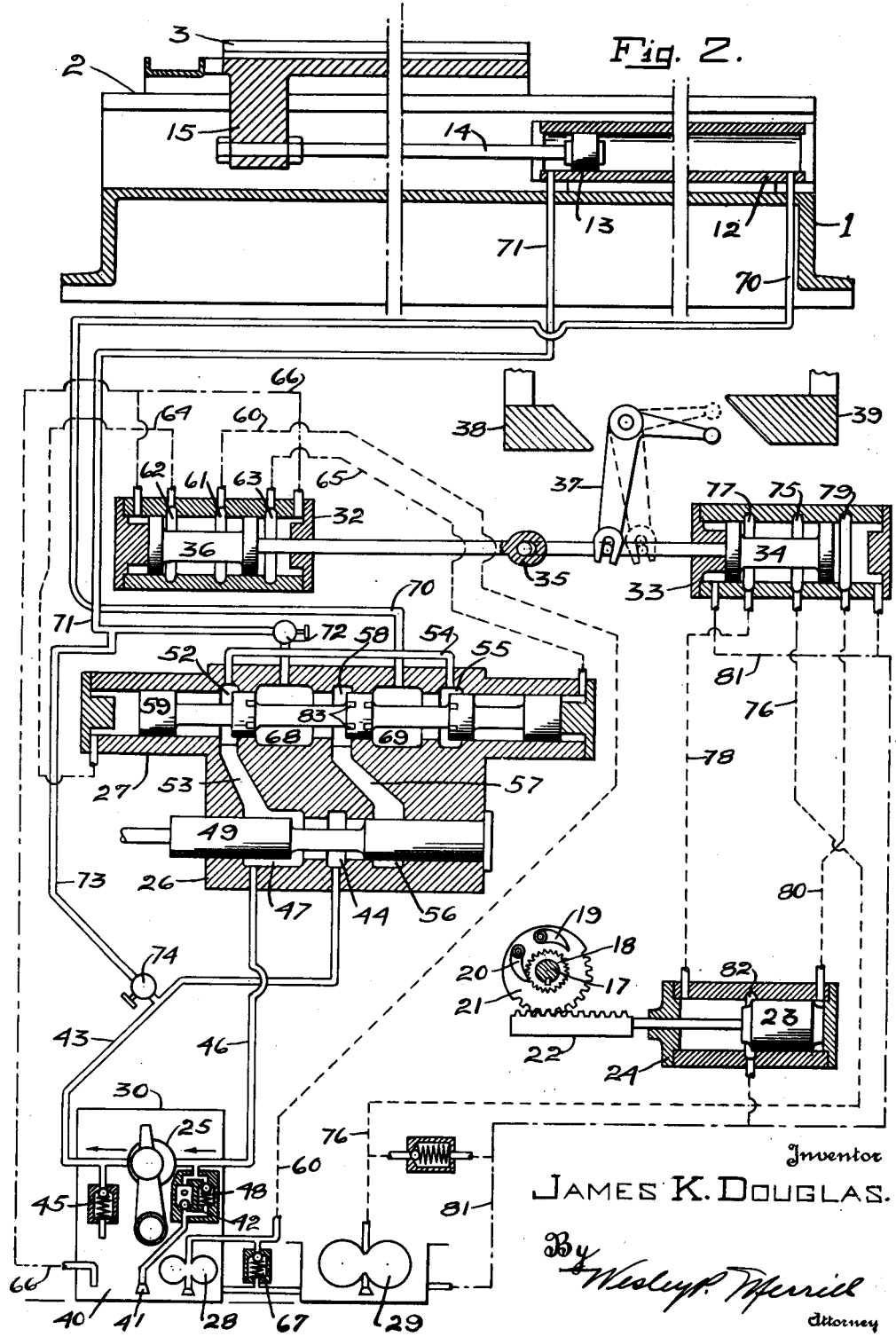
Fig. 2 is a schematic drawing showing the hydraulic circuit and illustarting the relation between the main drive motor and the work table of the machine shown in Fig. 1.

The table 3 is reciprocated by a hydraulic driving motor 12 which is secured to the bed 1 and has its piston 13 connected by its rod 14 to a lug 15 carried by the table 3 upon the underside thereof, as shown in Fig. 2.

The tool head 9 is moved along the cross rail 7 by a screw 16 which is driven from a driving shaft 17 through gearing not shown. The shaft 17 has a ratchet wheel 18 splined thereon and rotated intermittently by either a pawl 19 or a pawl 20 which are pivoted upon a pinion 21 journaled upon the shaft 17.

The pinion 21 meshes with a rack 22 which is connected to the piston 23 of a hydraulic cross-feed motor 24 and is reciprocated thereby to impart intermittent rotation to the shaft 17 through the ratchet wheel 18 and thereby move the tool head 9 along the cross rail 7 when the motor 24 is operated.

If the tool head 9 is to be moved away from the shaft 17, the ratchet wheel 18 is rotated by the pawl 20 and the pawl 19 is moved out of engagement therewith. If the tool head 9 is to be moved toward the shaft 17, the pawl 19 is moved into engagement with the ratchet wheel 18 and the pawl 20 is moved out of engagement therewith.

The driving motor 12 is operated by liquid supplied by a variable delivery positive displacement pump 25 and is controlled by a starting valve 26 and a hydraulically operated control valve 27 which is operated by liquid supplied by a control pump 28, and the feed motor 24 is operated by liquid supplied by a feed pump 29.

The pumps 25, 28 and 29, which are well known pumps and have not been illustrated nor described herein, are functionally independent of each other and the operation of one motor or valve is entirely unaffected by the operation of another motor or valve.

Preferably the pumps 28 and 29 are a standard type of gear pump and, together with the pump 25, are arranged in a pump housing 30 and driven by an electric motor 31.

The delivery of liquid for operating the valve 27 is controlled by a pilot valve 32 and the delivery of liquid to the feed motor 24 is controlled by a feed control valve 33 which is similar to the pilot valve 32 and, preferably, is operated slightly in advance thereof as shown diagrammatically in Fig. 2 in which the plunger 34 of the valve 33 is shown connected by a joint 35 to the plunger 36 of the valve 32 and also connected to the vertical arm of a bent lever 37 which is pivoted upon the frame 1 and operates the plunger 34 slightly in advance of the plunger 36 due to a slight amount of lost motion in the joint 35.

The lever 37 is operated mechanically by two table trips 38 and 39, which are carried by the table 3 in adjusted positions to engage the lever 37 as the table is reciprocated, and it may be operated manually to position the table 3 for the purpose of adjusting the work or the tools.

The pump 25 draws liquid from its reservoir 40 through a suction pipe 41 and a check valve 42 and delivers it into a high pressure supply pipe 43 which is connected to a port 44 in the starting valve 26 and is provided with a relief valve 45 to limit the ultimate pressure created by the pump 25.

Liquid is returned to the pump 25 through a pipe 46 having one of its ends connected to a port 47 in the starting valve 26 and its other end connected to the intake of the pump 25 and to a relief valve 48 through which liquid is discharged when the table 3 is being advanced and which maintains a predetermined back pressure upon the piston 13 to prevent the table 3 from jumping under the influence of variations in tool resistance.

The flow of liquid through the starting valve 26 is controlled by its plunger 49 which is operated manually, as by a hand lever 50 shown arranged on the outside of a box 51 which encloses the valve mechanism.

The port 47 is open at all times to the return pipe 46 and to a port 52 which is formed in the control valve 27 and connected by a duct 53 to the port 47 and by a duct 54 to another port 55 formed in the valve 27.

When the starting valve plunger 49 is in its neutral position as shown in Fig. 2, the liquid delivered by the pump 25 is bypassed freely through the valve 26.

When the starting valve plunger 49 is moved a sufficient distance to the right, as shown in Fig. 3, it closes communication between the port 44 and the port 47 and opens communication between the port 44 and a port 56 which is connected by a duct 57 to a port 58 in the valve 27 through which liquid is delivered by the pump 25 to the motor 12 to operate the same.

The flow of liquid through the valve 27 is controlled by its plunger 59 which is operated by liquid supplied by the pump 28, and the operation of the plunger 59 is controlled by the pilot valve 32.

The pump 28 is connected by a pipe 60 to a port 61 which is arranged intermediate the ends of the valve 32 and in communication alternately with two ports 62 and 63 which are connected, respectively, by two pipes 64 and 65 to the two ends of the valve 27.

With the pilot valve plunger 36 in the position shown in Fig. 2, liquid from the pump 28 will flow out of the valve 32 through the port 62 and enter the left end of the valve 27 through the pipe 64, forcing the plunger 59 to the right and expelling the liquid in the right end of the valve 27 through the pipe 65 and the port 63 into the valve 32 from whence it flows into a drain pipe 66 which connects both ends of the valve 32 to the reservoir 40.

When the plunger 36 is moved to the position shown in Fig. 3, liquid from the pump 28 will flow out of the valve 32 through the port 63 and the pipe 65 into the right end of the valve 27 and move the plunger 59 to the left and cause it to expel the liquid in the left end of the valve 27 through the pipe 64 and the left end of the valve 32 into the drain pipe 66.

When the control valve plunger 59 stalls at the end of its stroke in either direction, it is held in that position by the pressure of the liquid and the output of the pump 28 then exhausts through a relief valve 67 the resistance of which determines the pressure in the control circuit.

Liquid supplied by the pump 25 is directed to the front and rear ends of the motor 12 alternately by the control valve plunger 59 which controls communication between the port 58 and two ports 68 and 69, between the port 52 and the port 68, and between the port 55 and the port 69.

The port 69 is connected to the rear end of the motor 12 by a pipe 70 and the port 68 is connected to the front end of the motor 12 by a pipe 71 which has a shut off valve 72 connected therein and which is connected to the pipe 43 by a pipe 73 having a shut off valve 74 connected therein. The shut off valves 72 and 74 and the pipe 73 provide a path for bypassing the liquid expelled from the front end of the motor 12 to the rear end thereof to retract the piston 13 at high speed.

The delivery of liquid from the pump 29 to the cross feed motor 24 is controlled by the valve 33 which has a port 75 arranged intermediate its ends and connected by a pipe 76 to the outlet of the pump 29, a port 77 arranged upon one side of the port 75 and connected to the forward end of the motor 24 by a pipe 78, and a port 79 arranged upon the opposite side of the port 75 and connected by a pipe 80 to the rear end of the motor 24. The valve 33 also has both of its ends connected to the reservoir of the pump 29 by a drain pipe 81 which is connected also to a discharge port 82 formed in the motor 24 intermediate its ends.

With the valve plungers in the positions shown in Fig. 2, the liquid delivered by the pump 25 is bypassed freely through the pipe 43, the valve 26 and the pipe 46, the liquid delivered by the pump 28 is holding the control valve plunger 59 to the right and is exhausting through the relief valve 67, and the liquid delivered by the pump 29 is flowing freely through the pipe 76, the valve 33, the pipe 78, the motor 24 and the drain pipe 81.

If the shut-off valve 72 is open, the shut-off valve 74 closed and the starting valve plunger 49 moved to the right, the liquid discharged by the pump 25 will flow through the pipe 43, the valve 26, the valve 27, the pipe 71, to the front end of the motor 12 and force the piston 13 rearwardly to move the table 3 rearwardly, and the liquid in the rear end of the motor 12 will flow through the pipe 70, enter the valve 27 through the port 69, and pass out of the valve 27 through the port 55, the duct 54, the port 52, the duct 53, the valve 26 and the pipe 46 to the intake of the pump 25.

As a greater amount of liquid is exhausted from the rear end of the motor 12 than is required in the forward end thereof to move the piston 13 rearwardly due to the displacement of the rod 14, the pump 25 is unable to receive the entire volume discharged through the pipe 46 and the excess liquid is exhausted into the reservoir 40 through the relief valve 48.

As the table 3 reaches the limit of its rearward movement, the trip 38 swings the lever 37 upon its pivot and causes it to move the valve plungers 34 and 36 to the reverse position, as shown in Fig. 3.

Liquid from the feed pump 29 now enters the rear end of the feed motor 24 through the pipe 80 and forces its piston 23 forwardly, thereby rotating the pinion 21 and moving the pawl 20 to a new position, and liquid from the control pump 28 enters the right end of the valve 27 through the pipe 65 and forces the plunger 59 to the left to its reverse position.

The liquid in the forward end of the motor 24 is exhausted through the pipe 78 and the valve 33 to the drain pipe 81 and, when the piston 23 reaches the limit of its forward movement, the liquid delivered to the motor 24 through the pipe 80 flows freely into the drain pipe 81 through the port 82.

The liquid in the left end of the valve 27 is exhausted through the pipe 64 and the valve 32 to the drain pipe 66. When the valve plunger 59 stalls against the left end of the valve 27, it is held in that position by the pump pressure and the liquid delivered by the pump 28 exhausts through the relief valve 67.

With the valve plunger 59 in its reverse position, as shown in Fig. 3, the liquid delivered by the pump 25 flows through the pipe 70 into the rear end of the motor 12 and forces the piston 13 forwardly to move the table 3 forwardly.

If the machine is being used for grinding, the shut-off valve 72 is opened, the shut-off valve 74 is closed and the liquid in the forward end of the motor 12 is returned to the pump 25 through the pipe 71, the valves 27 and 26 and the pipe 46. The pump 25, therefore, supplies the entire volume of liquid required to move the piston 13 and the forward speed of the table 3 will be slower than its rearward speed due to the displacement of the rod 14. The difference between the two speeds, however, is so small that it does not affect the efficiency of the machine during grinding operations.

If the work is to be operated upon by the tool 10, the valve 74 is opened and the valve 72 is closed, and then liquid in the forward end of the motor 12 is bypassed through the pipes 71, 73 and 43, the valves 26 and 27 and the pipe 70 to the rear end of the motor 12. The pump 25, therefore, need supply only an amount of liquid equal to the displacement of the rod 14 and the table 3 is moved forwardly at high speed.

As a practical illustration, a driving motor having a 3½" bore and 1¾" piston rod will move the table 3 forwardly at three times its rearward speed when the shut-off valve 72 is closed and the shut-off valve 74 is opened, and will move the table 3 forwardly at three-fourths of its rearward speed when the shut-off valve 72 is opened and the shut-off valve 74 is closed, thus providing a great increase in return speed for cutting operations and only a small variation in speed for grinding operations.

As the table 3 reaches the limit of its return movement, the trip 39 operates the lever 37 and causes it to move the valve plungers 34 and 36 to the positions shown in Fig. 2.

Liquid from the pump 29 enters the forward end of the motor 24 through the pipe 78 and forces the piston 23 rearwardly until it reaches the limit of its movement and uncovers the port 82 to allow the liquid to flow into the drain pipe 81, and liquid from the pump 28 enters the left end of the valve 27 through the valve 32 and moves the plunger 59 to the position shown in Fig. 2.

As the piston 23 moves rearwardly, the rack 22 rotates the pinion 21 and the pawl 20 rotates the ratchet wheel 18 and the shaft 17, thereby imparting rotation to the screw 16 and feeding the tool head 9 along the cross rail 7 to bring the tool or grinding wheel carried thereby into alinement with a different part of the work 4.

Due to the slack or lost motion in the joint 35, the plunger 34 starts to move slightly in advance of the plunger 36 and liquid from the pump 29 reaches the forward end of the motor 24 and starts the piston 23 upon its feed stroke before liquid from the pump 28 reaches the left end of the valve 27 and starts the plunger 59 upon its movement to the right. Also, the plunger 59 must substantially complete its stroke before liquid from the pump 25 is directed into the rear end of the motor 12 to advance the table 3 upon its cutting stroke.

The delay thus produced is very slight but, as the pump 29 has sufficient capacity to operate the motor 24 at high speed, the tool head 9 is fed along the cross rail 7 to a new position at substantially the same instant that the table 3 comes to rest. Consequently, the table 3 may be reversed from a point much nearer the end of a cut than was possible heretofore.

The provision of a separate feed pump 29 enables the pump 25 to operate the motor 12 at the predetermined speeds at all times and, as valve plunger 59 is ordinarily provided with a number of small slots 83 which admit a small volume of liquid to the motor 12 in advance of the full volume and gradually cut off the delivery of liquid thereto, thereby gradually accelerating and decelerating the movement of the table 3, the acceleration curve remains constant. Further, the operation of the table 3 is unaffected by the operation of the feed mechanism as is the case in the prior machines in which the same pump is employed for both purposes.

The invention herein set forth is susceptible of various modifications and adaptations without departing from the scope thereof as hereafter claimed.

The invention is hereby claimed as follows:

1. The combination, with a machine having a work carriage and a tool carriage each movable relatively to the other, of a hydraulic driving motor having its piston connected to said work carriage for reciprocating the same, a variable displacement pump for supplying driving liquid to said motor, a hydraulically operated valve for controlling the flow of said driving liquid, a small capacity constant displacement pump for supplying liquid to operate said hydraulically operated valve, a hydraulic feed motor mechanically connected to said tool carriage for moving the same, a larger capacity constant displacement feed pump for supplying liquid to said feed motor, valve means responsive to the movement of said work carriage for controlling the delivery of liquid to said feed motor to cause it to operate in opposite directions alternately, and means for bypassing freely the output of said feed pump upon said feed motor completing its operation in one direction.

2. The combination, with a machine having a work carriage and a tool carriage movable relatively to each other, of a hydraulic driving motor having its piston connected to said work carriage for reciprocating the same, a variable displacement pump for supplying driving liquid to said motor, a hydraulically operated control valve for controlling the flow of said liquid, a small capacity constant displacement pump for supplying liquid to said valve to operate the same, a pilot valve for controlling the delivery of liquid to said control valve, a hydraulic feed motor connected to said tool carriage for moving the same, a feed pump for supplying liquid to said feed motor, a feed control valve for controlling the delivery of liquid to said feed motor, to cause it to operate in opposite directions alternately, means for bypassing freely the output of said feed pump upon said feed motor completing its operation in one direction, and means for operating said pilot and feed control valves.

3. The combination, with a machine having a work carriage and a tool carriage movable relatively to each other, of a hydraulic driving motor having its piston connected to said work carriage for reciprocating the same, a variable displacement pump for supplying driving liquid to said motor, a hydraulically operated control valve for controlling the flow of said liquid, a small capacity constant displacement pump for supplying liquid to said valve to operate the same, a pilot valve for controlling the delivery of liquid to said control valve, a hydraulic feed motor connected to said tool carriage for moving the same, a larger capacity constant displacement feed pump for supplying liquid to said feed motor to cause it to operate in opposite directions alternately, means for bypassing freely the output of said feed pump upon said feed motor completing its operation in either direction, a feed control valve for controlling the delivery of liquid to said feed motor, and means operated in accordance with the movement of said work table for operating said pilot and feed control valves and having means to start the operation of said feed control valve in advance of the operation of said pilot valve.

4. The combination, with a machine having a work carriage and a tool carriage each movable relatively to the other, of a hydraulic driving motor connected to one of said carriages for reciprocating the same, a variable displacement pump for supplying driving liquid to said motor, a control valve for controlling the flow of said driving liquid, hydraulic means for operating said control valve, a small capacity constant displacement pump for supplying liquid to operate said hydraulic means, a larger capacity constant displacement feed pump, a hydraulic feed motor having its piston mechanically connected to the other carriage for moving the same and its cylinder connected to said feed pump and provided with a port which is covered by said piston during its stroke and uncovered after said piston has reached the limit of its stroke to bypass freely the output of said feed pump, and valve means operated in accordance with movement produced by said driving motor for controlling the delivery of liquid to said feed motor.

5. The combination, with a machine tool having a reciprocating carriage, of a reciprocating hydraulic motor connected to said carriage to reciprocate the same and having its piston rod connected to one end only of its piston and extending through one end only of its cylinder whereby the rod end of the piston has a smaller effective pressure area than the other end thereof and the rod end of said cylinder has a smaller displacement than the head end thereof, fluid channels connected to both ends of said motor, a source of pressure liquid, means for directing liquid from said source through said channels to opposite ends of said motor alternately to reciprocate its piston and for allowing the escape from said channels of liquid exhausted from said motor by its piston to thereby cause said motor to move said carriage in both directions at slow speed, and means alternatively operable for connecting said channels to divert to the head end of said motor the liquid exhausted from the rod end thereof without affecting the escape from said channels of liquid exhausted from the head end of said motor to thereby cause said motor to move said carriage at high speed during the delivery of liquid to its head end and to move said carriage at a relatively slow speed during the delivery of liquid to its rod end.

6. The combination, with a machine tool having a reciprocating carriage, of a reciprocating hydraulic motor connected to said carriage to reciprocate the same and having its piston rod connected to one end only of its piston and extending through one end only of its cylinder whereby the rod end of the piston has a smaller effective pressure area than the other end thereof and the rod end of said cylinder has a smaller displacement than the head end thereof, fluid channels connected to both ends of said motor, a unidirectional variable delivery pump, means including a hydraulically operated valve for directing liquid from said pump through said channels to opposite ends of said motor alternately to reciprocate its piston and for allowing the escape from said channels of liquid exhausted from said motor by its piston to thereby cause said motor to move said carriage in both directions at slow speed, and means alternatively operable for connecting said channels to divert to the head end of said motor the liquid exhausted from the rod end thereof without affecting the escape from said channels of liquid exhausted from the head end of said motor to thereby cause said motor to move said carriage at high speed during delivery of liquid to its head end and to move said carriage at a relatively slow speed during delivery of liquid to its rod end.

7. The combination, with a machine tool having a reciprocating carriage, of a reciprocating hydraulic motor connected to said carriage to reciprocate the same and having its piston rod connected to one end only of its piston and extending through one end only of its cylinder whereby the rod end of the piston has a smaller effective pressure area than the other end thereof and the rod end of said cylinder has a smaller displacement than the head end thereof, fluid channels connected to both ends of said motor, a source of pressure liquid, means including a hydraulically operated valve for directing liquid from said source through said channels to opposite ends of said motor alternately to reciprocate its piston and for allowing the escape from said channels of liquid exhausted from said motor by its piston to thereby cause said motor to move said carriage in both directions at slow speed, means alternatively operable for connecting said channels to divert to the head end of said motor the liquid exhausted from the rod end thereof without affecting the escape from said channels of liquid exhausted from the head end of said motor to thereby cause said motor to move said carriage at high speed during delivery of liquid to its head end and to move said carriage at a relatively slow speed during delivery of liquid to its rod end, and a separate source for supplying liquid to said valve to operate the same.

8. The combination, with a machine tool having a reciprocating carriage, of a reciprocating hydraulic motor connected to said carriage to reciprocate the same and having its piston rod connected to one end only of its piston and extending through one end only of its cylinder whereby the rod end of the piston has a smaller effective pressure area than the other end thereof and the rod end of said cylinder has a smaller displacement than the head end thereof, fluid channels connected to both ends of said motor, a pump, means including an operating valve for directing liquid from said pump through said channels to opposite ends of said motor alternately to reciprocate its piston and for allowing the escape from said channels of liquid exhausted from said motor by its piston to thereby cause said motor to move said carriage in both directions at slow speed, hydraulic means for operating said valve, means responsive to the movement of said carriage for controlling the operation of said hydraulic means, and means alternatively operable for connecting said channels to divert to the head end of said motor the liquid exhausted from the rod end thereof without affecting the escape from said channels of liquid exhausted from the head end of said motor to thereby cause said motor to move said carriage at high speed during delivery of liquid to its head end and to move said carriage at a relatively slow speed during delivery of liquid to its rod end.

9. The combination, with a machine tool having a reciprocating carriage, of a reciprocating hydraulic motor connected to said carriage to reciprocate the same and having its piston rod connected to one end only of its piston and extending through one end only of its cylinder whereby the rod end of the piston has a smaller effective pressure area than the other end thereof and the rod end of said cylinder has a smaller displacement than the head end thereof, fluid channels connected to both ends of said motor, a pump, means including a hydraulically operated operating valve for directing liquid from said pump through said channels to opposite ends of said motor alternately to reciprocate its piston and for allowing the escape from said channels of liquid exhausted from said motor by its piston to thereby cause said motor to move said carriage in both directions at slow speed, an independent control pump for supplying liquid to said operating valve to operate the same, a pilot valve for controlling the delivery of liquid from said control pump to said operating valve, means responsive to the movement of said carriage for operating said pilot valve, and means alternatively operable for connecting said channels to divert to the head end of said motor the liquid exhausted from the rod end thereof without affecting the escape from said channels of liquid exhausted from the head end of said motor to thereby cause said motor to move said carriage at high speed during delivery of liquid to its head end and to move said carriage at a relatively slow speed during delivery of liquid to its rod end.

JAMES K. DOUGLAS.